(12) United States Patent
Wu et al.

(10) Patent No.: US 8,730,982 B2
(45) Date of Patent: May 20, 2014

(54) SCHEDULING OF DATA TRANSMISSION WITH MINIMUM AND MAXIMUM SHAPING OF FLOWS IN A NETWORK DEVICE

(75) Inventors: Chien-Hsien Wu, Cupertino, CA (US); Bruce Kwan, Sunnyvale, CA (US); Philip Chen, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 652 days.

(21) Appl. No.: 11/594,744

(22) Filed: Nov. 9, 2006

(65) Prior Publication Data
US 2007/0104210 A1 May 10, 2007

Related U.S. Application Data

(60) Provisional application No. 60/735,251, filed on Nov. 10, 2005, provisional application No. 60/772,886, filed on Feb. 14, 2006.

(51) Int. Cl.
*H04L 12/863* (2013.01)
*H04L 12/56* (2006.01)

(52) U.S. Cl.
CPC ............ *H04L 47/528* (2013.01); *H04L 47/527* (2013.01); *H04L 47/6235* (2013.01)
USPC ........... 370/412; 370/413; 370/414; 370/415; 370/416; 370/417; 370/418

(58) Field of Classification Search
CPC ....... H04L 47/50; H04L 47/525; H04L 47/58; H04L 47/60; H04L 47/623
USPC .................... 370/412, 395.4, 395.41, 395.42, 370/395.43, 229, 230.1, 231, 235
See application file for complete search history.

(56) References Cited

U.S. PATENT DOCUMENTS

| | | | |
|---|---|---|---|
| 6,469,982 B1* | 10/2002 | Henrion et al. ................ | 370/230 |
| 6,674,718 B1* | 1/2004 | Heddes et al. ................ | 370/230 |
| 6,687,247 B1* | 2/2004 | Wilford et al. ................ | 370/392 |
| 6,810,426 B2* | 10/2004 | Mysore et al. ................ | 709/234 |
| 6,959,002 B2* | 10/2005 | Wynne et al. ................ | 370/412 |
| 7,023,799 B2* | 4/2006 | Takase et al. ............... | 370/230.1 |
| 7,418,000 B2* | 8/2008 | Bruckman et al. ............ | 370/412 |
| 7,533,154 B1* | 5/2009 | Chen et al. ..................... | 709/213 |
| 2001/0024452 A1* | 9/2001 | Liu et al. ........................ | 370/468 |

(Continued)

OTHER PUBLICATIONS

Shreedar.M, Varghese.G, "Efficient Fair Queuing using Deficit Round Robin", SIGCOMM '95, pp. 231-245.*

*Primary Examiner* — Timothy J Weidner
*Assistant Examiner* — Tarell Hampton
(74) *Attorney, Agent, or Firm* — McDermott Will & Emery LLP (57) ABSTRACT

A network device for processing data includes at least one ingress module for performing switching functions on incoming data, a memory management unit for storing the incoming data and at least one egress module for transmitting the incoming data to at least one egress port. The at least one egress module includes an egress scheduling module and multiple queues per each of the at least one egress port. Each of the multiple queues serve data attributable to a class of service, and the egress scheduling module is configured to service a minimum bandwidth requirement for each of the multiple queues and then to service the multiple queues to allow for transmission of a maximum allowable bandwidth through a weighting of each of the multiple queues.

18 Claims, 5 Drawing Sheets

(56) References Cited

U.S. PATENT DOCUMENTS

| | | |
|---|---|---|
| 2001/0033581 A1* | 10/2001 | Kawarai et al. ............... 370/468 |
| 2003/0061338 A1* | 3/2003 | Stelliga ......................... 709/224 |
| 2003/0189934 A1* | 10/2003 | Jeffries et al. .............. 370/395.4 |
| 2004/0015599 A1* | 1/2004 | Trinh et al. ................... 709/232 |
| 2004/0017825 A1* | 1/2004 | Stanwood et al. ............ 370/468 |
| 2004/0085964 A1* | 5/2004 | Vaananen .................. 370/395.4 |
| 2004/0264500 A1* | 12/2004 | Bansal et al. ................. 370/468 |
| 2005/0047425 A1* | 3/2005 | Liu et al. ....................... 370/411 |
| 2005/0047783 A1* | 3/2005 | Sisto et al. ...................... 398/71 |
| 2005/0083920 A1* | 4/2005 | Barri et al. .................... 370/360 |
| 2005/0243853 A1* | 11/2005 | Bitar et al. .................... 370/432 |
| 2007/0070895 A1* | 3/2007 | Narvaez ....................... 370/230 |

* cited by examiner

SCHEDULING OF DATA TRANSMISSION WITH MINIMUM AND MAXIMUM SHAPING OF FLOWS IN A NETWORK DEVICE

CROSS-REFERENCE TO RELATED APPLICATIONS

This application claims priority of U.S. Provisional Patent Application Ser. No. 60/735,251, filed on Nov. 10, 2005 and U.S. Provisional Patent Application No. 60/772,886, filed on Feb. 14, 2006. The subject matter of the earlier filed applications is hereby incorporated by reference.

BACKGROUND OF THE INVENTION

1. Field of the Invention

The invention relates to a method and apparatus for high performance switching in local area communications networks. In particular, the invention relates to a process of scheduling of packets and allowing for a shaping of the flows of the packets so that all of the output bandwidth can be fairly and fully utilized according to set requirements.

2. Description of the Related Art

A switching system may include one or more network devices, such as an Ethernet switching chip, each of which includes several modules that are used to process information that is transmitted through the device. Specifically, the device includes at least one ingress module, a Memory Management Unit (MMU) and at least one egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs. Some devices also include a CPU processing module through which the device interfaces with external CPU ports.

In the processing of datagrams, such as packets, certain packets may receive preferential treatment when compared to other packets. As such, certain packets may be assigned a higher Quality of Service (QoS), such that those packets are given preferred treatment. This preferred treatment may be given, for example, to packets where time sensitive receipt of those packets is important. In many prior art systems, many QoS states are assigned, so that varying degrees of handling and prioritization can be provided. However, even if a small amount of bandwidth is allocated to a particular QoS state and is not used, that bandwidth is "wasted," in that it could be utilized by other resources. Thus, there is a need in the prior art for systems that allow for dynamic management of buffers and scheduling of data transmission to allow for efficient utilization of all resources of a network device.

BRIEF DESCRIPTION OF THE DRAWINGS

For the present invention to be easily understood and readily practiced, various embodiments will now be described, for purposes of illustration and not limitation, in conjunction with the following figures.

DETAILED DESCRIPTION OF THE PREFERRED EMBODIMENTS

Shaping of the egress packet bandwidth, according to embodiments of the present invention, utilizes a combination of minimum bandwidth guarantee/maximum bandwidth allowable shaping and weighted deficit round robin scheduling scheme to select a packet from different CoS queues, for a given output port. For each queue, during minimum bandwidth guarantee shaping, the scheduler will be selected based on round robin scheduling or strict priority scheduling, based on a separate minimum bandwidth strict priority register.

After satisfying minimum bandwidth guarantees, each queue is entered into a maximum bandwidth allowable region, where the scheduler will use either weighted deficit round robin (WDRR) or strict priority (SP) to pick a packet from different CoS queues. A weight register is used to store the weight value that is used in that process. According to embodiments of the instant invention, when the weight is zero, this queue is treated as strict priority. When weight is non-zero, it is used to determine a WDRR quantum for each queue. The packet length information is fed back into the minimum/maximum bucket to account for transmitted bandwidth that is actually used. The same information is also feed back into a WDRR credit count to adjust actual bandwidth usage. The WDRR credit count is based on a fixed unit of some number of bytes, i.e., cells, to count transmit bandwidth. The packet length is first sent to a residue counter to calculate the positive or negative residue of actual data and a cell size. When the scheduler schedules out a cell, which may, for example, be 128 bytes, it will increment the WDRR credit counter and adjust the value of a cell granularity accumulation of positive or negative residue in residue counter. This is method accounts for accurate transmit bandwidth.

Figure 1:
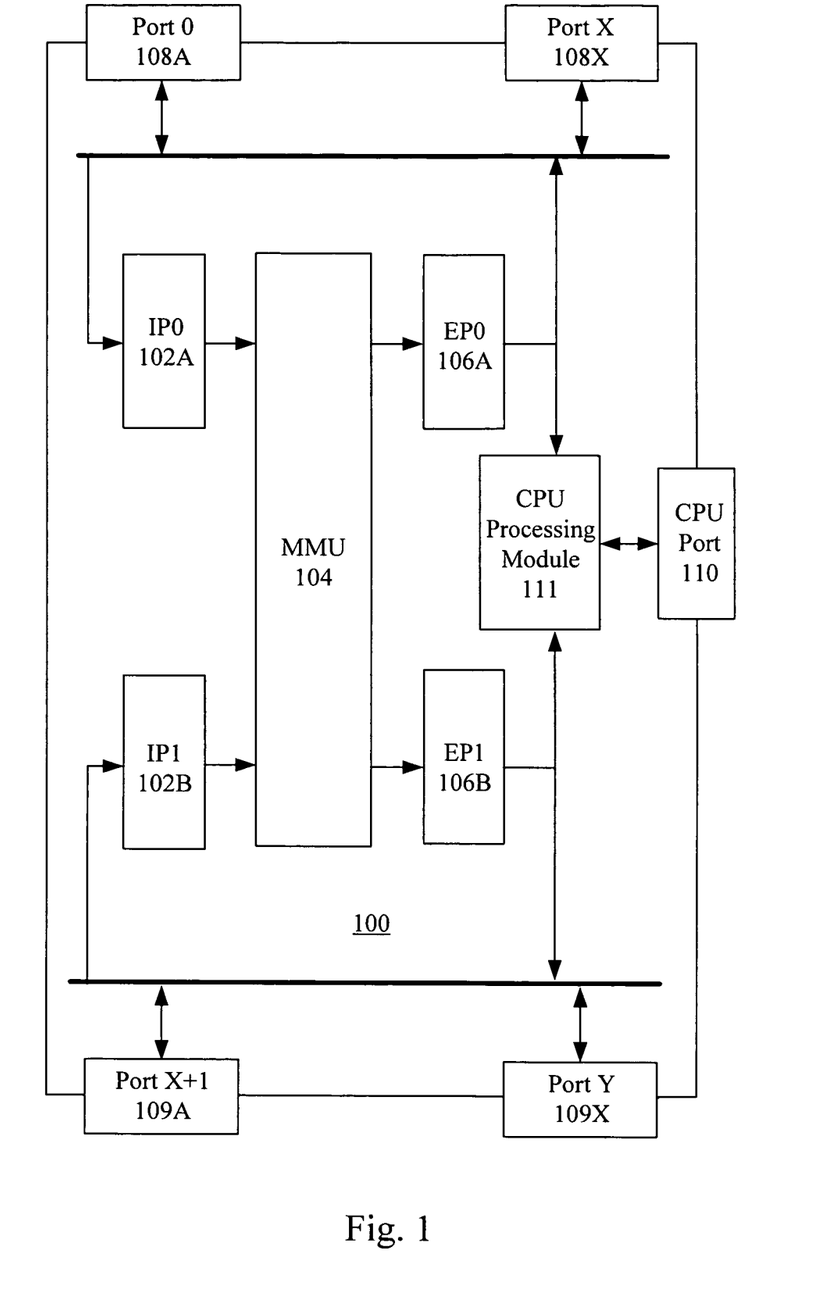
FIG. 1 is an illustration of a network device in which an embodiment of the present invention may be implemented.

FIG. 1 illustrates a network device, such as a switching chip, in which an embodiment the present invention may be implemented. Device 100 includes ingress modules 102A and 102B, a MMU 104, and egress modules 106A and 106B. Ingress modules 102A and 102B are used for performing switching functionality on an incoming packet. MMU 104 is used for storing packets and performing resource checks on each packet. Egress modules 106A and 106B are used for performing packet modification and transmitting the packet to an appropriate destination port. Each of Ingress modules 102A, 102B, MMU 104 and Egress modules 106A and 106B include multiple cycles for processing instructions generated by that module. Device 100 implements a dual-pipelined approach to process incoming packets. One aspect which effects the performance of device 100 is the ability of the pipelines to process one packet every clock cycle. It is noted that the embodiment illustrated in FIG. 1 shows dual-pipelines, the present invention may also be applicable to systems that use a single pipeline or more than two pipelines.

Device 100 can also include a number of ports to send and receive data, such as Port 0 to PortX, 108A-108X, and Port X+1 to PortY, 109A-109X. The ports can be separated and are serviced by different ingress and egress port modules to support the dual-pipeline structure. One or more internal fabric high speed ports, for example a highspeed port, or more external Ethernet ports may be configured from the above-discussed ports. The network device can also include a CPU port 110 and a CPU processing module 11 to communicate with an external CPU. High speed ports are used to interconnect various network devices in a system and thus form an internal switching fabric for transporting packets between external source ports and one or more external destination ports. As such, high speed ports are not externally visible outside of a system that includes multiple interconnected network devices. CPU port 110 can be used to send and receive packets to and from external switching/routing control entities or CPUs. Device 100 interfaces with external/off-chip CPUs through a CPU processing module 111, which interfaces with a PCI bus that connects device 100 to an external CPU.

Network traffic also enters and exits device 100 through external ports 108A-108X and 109A-109X. Specifically, traffic in device 100 is routed from an external source port to one or more unique destination ports. In one embodiment of the invention, device 100 supports physical Ethernet ports and logical (trunk) ports.

Once a packet enters device 100 on a source port 109A-109X or 108A-108X, the packet is transmitted to one of the ingress modules 102A or 102B for processing. Packets may enter device 100 from a XBOD or a GBOD. The XBOD is a block that has one 10GE/12G MAC and supports packets from high speed ports and the GBOD is a block that has 12 10/100/1G MAC and supports packets from other ports.

The architecture of the network device provides for the ability to process data received quickly and also allows for a flexibility of processing. A part of this flexibility comes from the pipeline structure that is used to process packets once they are received. Data from the packet and attributes of that packet move through the modules of the network device, discussed above, in a pipeline structure. Each stage in the pipeline structure requires a set number of clock cycles and the packets are processed in order. Therefore, the packet is parsed, table lookups are performed, a decision routing process is performed and the packet is modified, before being sent out on an egress port. Each stage in the pipeline performs its function so that the overall function of the network device is achieved.

Figure 2:
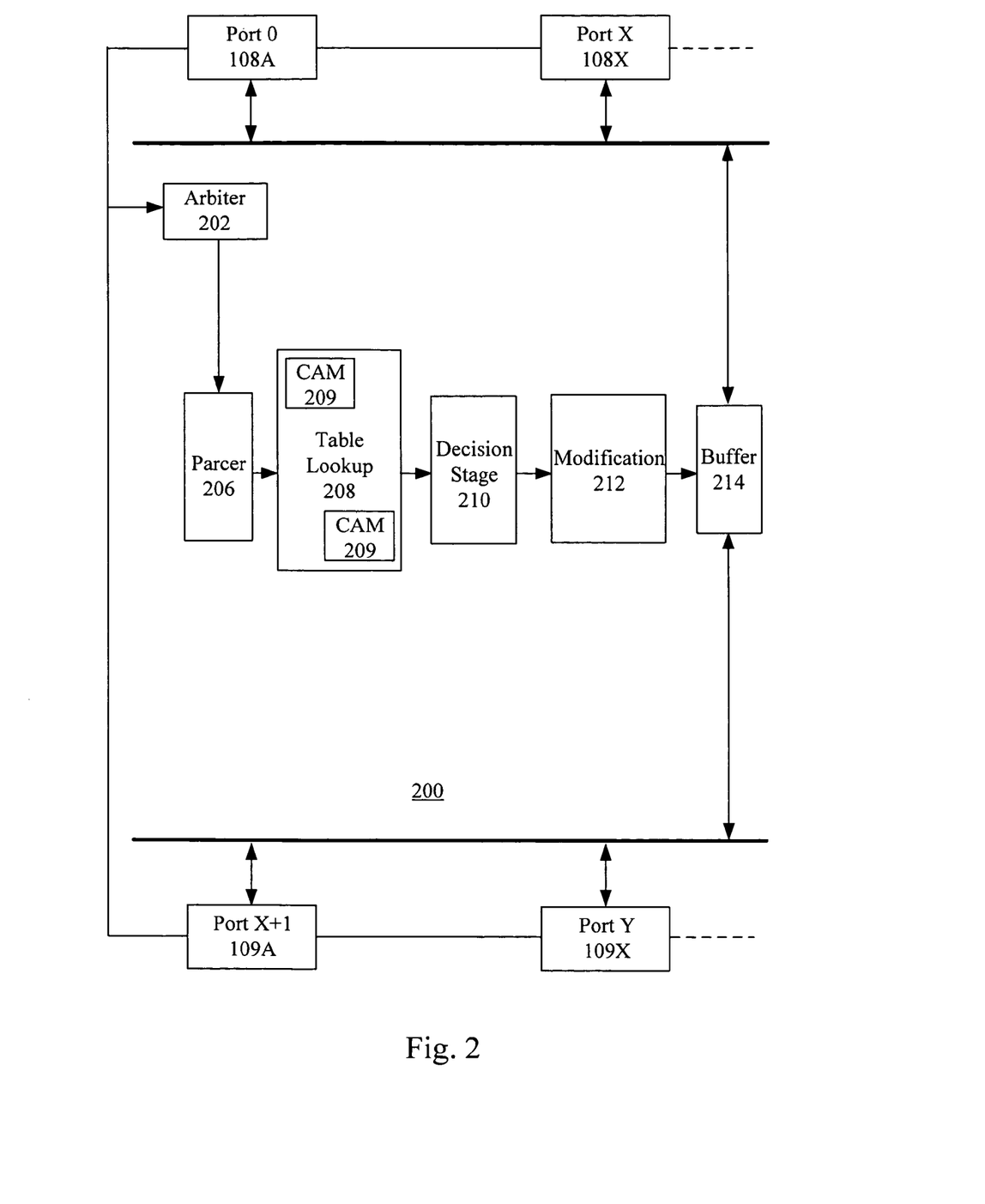
FIG. 2 illustrates a centralized egress pipeline architecture of an ingress stage in an exemplary embodiment of the present invention.

FIG. 2 illustrates a centralized egress pipeline architecture 200 of egress stages 106A and 106B, i.e. one side of the dual-pipeline. The egress pipeline can include an arbiter 202, a parser 206, a table lookup stage 208, multiple content-addressable memories (CAMs) 209, a decision stage 210, a modification stage 212 and a data buffer 214. Arbiter 202 provides arbitration for accessing egress pipeline 200 resources between packet data and control information from MMU and information from the CPU. Parser 206 performs packet parsing for table lookups and modifications. Table lookup stage 208 performs table lookups for information transmitted from parser 206, through use of the CAMs 209. The decision stage 210 is used for deciding whether to modify, drop or otherwise process the packet. The modification stage 212 makes modifications to the packet data based on outputs from previous stages of the ingress module.

Arbiter 202 collects packet data and control information from MMU 104 and read/write requests to registers and memories from the CPU and synchronizes the packet data and control information from MMU 104 and writes the requests from the CPU in a holding register. Based on the request type from the CPU, arbiter 202 generates pipeline register and memory access instructions and hardware table initialization instructions. After arbiter 202 collects packet data, CPU requests and hardware table initialization messages, it generates an appropriate instruction. According to an embodiment, arbiter 202 generates a Start Cell Packet instruction, an End Cell of Packet instruction, a Middle Cell of Packet instruction, a Start-End Cell of Packet instruction, a Register Read Operation instruction, a Register Write Operation instruction, a Memory Read Operation instruction, a Memory Write Operation instruction, a Memory Reset Write Operation instruction, a Memory Reset Write All Operation instruction and a No Operation instruction. Egress pipeline resources associated Start Cell Packet instructions and Start-End Cell of Packet instructions are given the highest priority by arbiter 204. End Cell of Packet instructions, Middle Cell of Packet instructions, Register Read Operation instructions, Register Write Operation instructions, Memory Read Operation instructions and Memory Write Operation instruction receive the second highest priority from arbiter 204. Memory Reset Write Operation instructions and Memory Reset Write All Operation instructions receive the third highest priority from arbiter 204. No Operation instructions receive the lowest priority from arbiter 204.

After receiving an instruction from arbiter 204, the parser 206 parses packet data associated with the Start Cell of Packet instruction and the Start-End Cell of Packet instruction using the control information and a configuration register transmitted from arbiter 206. According to an embodiment, the packet data is parsed to obtained L4 and L3 fields which appear in the first 148 bytes of the packet. Table lookup stage 208 then receives all packet fields and register values from parser 206.

Figure 3:
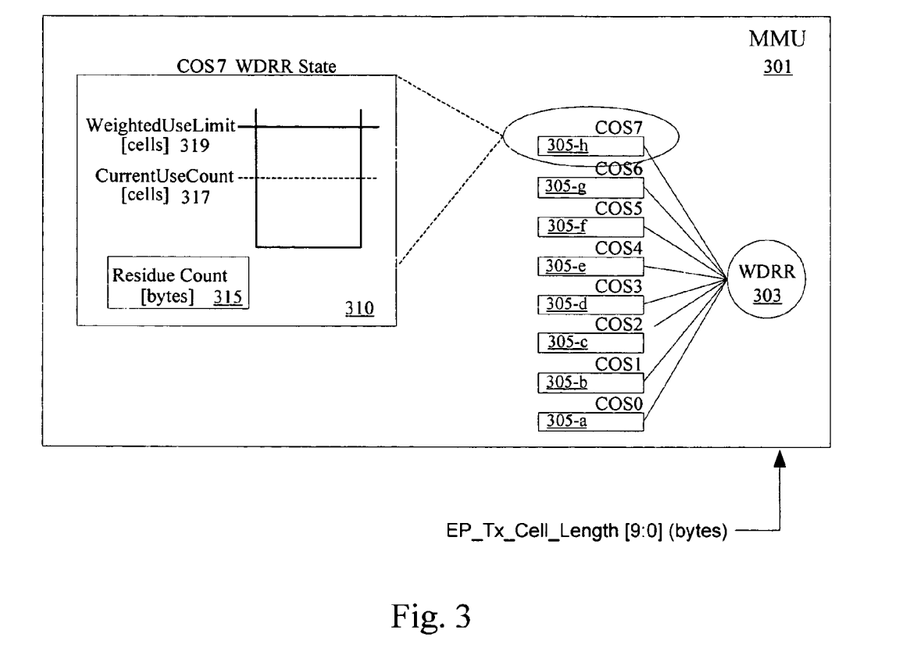
FIG. 3 illustrates a schedule mechanism in an exemplary embodiment of the present invention.

The Egress Scheduler (ES) is a pipeline structure processor. It is implemented as two identical blocks, one for each pipeline, discussed above. Another function inside the ES block is port tdm scheduling for two MMU Egress Pipelines. One pipeline of that architecture of the MMU 301 is illustrated in FIG. 3. This arbiter will determine the sequential order for serving each Egress port's packet transmit request.

The Egress Scheduler performs the following functions: Port TDM scheduling, QM and SC Queues, Strict Priority Scheduling (SP), Round Robin Priority Scheduling (RR), Weight Round Robin Priority Scheduling (WRR), Weight Deficit Round Robin Scheduling (WDRR), Min/Max Shaping Support, Egress Port Metering Mask Support, COS Based Flow Control Support, CPU COS Mask Support, and Register Read/Write Support. Each of the function is described below.

The port TDM scheduling can be implemented in different TDM schedules, depending on the port configurations of the network device. The basic rule for this TDM scheduling is for each 12G HG port, every 8 cycles need to get service. For each 10G Ethernet port, every 10 cycles need to get service. It is noted that each pipeline can be in its own TDM mode, which is programmable in ESTDMCONFIG registers.

The present invention, according to certain embodiments, supports two new queues for each egress port: QM (Queue Management) and SC (System Control). These two new queues are set to highest priority to be scheduled to each egress port, according to at least one embodiment. Within these two queues, QM is higher priority than SC. QM queue is mainly to service end to end flow control packets in order to pass through this type of packet flow through each device within the same fabric. SC queue is mainly to service one switch CPU to another switch CPU's system control packet. This type of traffic need to service as soon as possible in order let peer end's CPU can react on urgent congestion condition.

When a port's arbitration mode is selected as Strict Priority (SP) Scheduling Mode, the queue selected from this port will be following by strict priority fashion. This means, when a higher priority queue is not empty, ES block will keep selecting this queue till it finally empty. If ES block is currently selecting a low priority queue and suddenly a higher queue becomes not empty, ES will swim back to select higher priority queue.

When a port's arbitration mode is selected as Round Robin Scheduling Mode, the queue selected from this port will be followed in a Round Robin fashion. Each round starts from CoS7 and finishes at CoS0. Those specific CoS queues are illustrated in FIG. 3 as 305-a through 305-h. When the ES block is selecting CoS0, next time it will start from CoS7 again. During each round, if there is any QM or SC queue that becomes non-empty, ES block will suspend round robin scheduling and remember which it has left. Then the ES block will service these two queues first and when both two queues are back to empty, ES block will resume the round robin scheduling and start from where it has left. The moving of each selection is on packet boundary only. The ES block does not interleave schedule multiple COS cells between packets.

When a port's arbitration mode is selected as Weighted Round Robin Scheduling Mode, the queue selected from this port is basically following by Round Robin fashion but with a weighted packet credit for each queue. For every packet scheduled, a credit will be incremented from a weight credit counter. The ES block will keep selecting CoS queues in a round robin fashion until any CoS queue's credit count matched its weighted credit and it is dropped from the round.

Each sub round starts from CoS7 and finishes at CoS0. When the ES block is selecting CoS0, next time it will start from CoS7 again. When each queue's weight credit counter matches the queue's weighted credit limit a round of WRR is finished and all queues start all over again. Within a round, if a queue becomes empty, its credit counter will be kept until the current round completed. Therefore, if a queue is constantly empty and each empty state only lasts for a short period, its credit counter will still be valid.

During each round, if there is any QM or SC queue that becomes non-empty, the ES block will suspend round robin scheduling and remember at which point it left off. Then, the ES block will service these two queues first and when both two queues are back to empty, ES block will resume the round robin scheduling and start from the point that it left from. If a queue's weight register is programmed as 0, this queue will be treated as priority scheduling and will not participate in WRR selection. If any one of zero-weighted queue is not empty, ES block will not start or resume normal WRR round.

When a port's arbitration mode is selected to be Weighted Deficit Round Robin (WDRR), the backlogged and eligible CoS queues associated with the port are serviced according to a byte-accurate relative bandwidth sharing scheme. This behavior is accomplished by having the scheduler allow the CoS queues to send a weighted amount of traffic in rounds. This is illustrated in FIG. 3 as a state machine 310 for CoS7, but all of the queues have similar functionalities. In each round, a CoS queue is allowed to send a configurable number of cells (128 bytes) as defined by the WeightedUseLimit 319. Each CoS queue tracks its usage, i.e. CurrentUseCount 317. When the CurrentUseCount 317 rises above the WeightedUsedLimit 319, the COS queue is not allowed to transmit during the current round.

A WDRR round is over when all CoS queues are in at least one of the following conditions:
1. CoS queue is empty;
2. CoS queue has received less than its MinBW or more than its MaxBW specifications (see below for interactions with Min/Max BW meters);
3. CoS queue has sent more than its limit (CurrentUseCount>WeightedUseLimit);
4. CoS queue is being serviced with Strict Priority rather than WDRR (see below for details regarding interactions with Strict Priority configurations). When the round is over, each CoS queue's CurrentUseCount is decremented by its associated WeightedUseLimit with a floor of 0. The COS queues are "marked" as being eligible in the next round if CurrentUseCount<=WeightedUseLimit.

The WeightedUseLimit is calculated by multiplying the CoS queue's associated weight (1-127) by the port's MTU_QUANTA_SELECT. The MTU_QUANTA_SELECT can be selected to match the expected max frame length. Four possible options, for certain embodiments, for MTU_QUANTA_SELECT are 2,048 bytes, 4,096 bytes, 8,192 bytes and 16,384 bytes.

During a round, the scheduler does not continue to service a single CoS queue at a time until its CurrentUseCount is greater than its WeightedUseLimit. Rather, the scheduler allows interleaving of packet transmissions between CoS queue transmissions to minimize latency. Consequently, a single WDRR round is actually composed of one or more sub rounds where each of the backlogged and eligible CoS queues are serviced in round robin order. The ES block will continue selecting a CoS queue as a part of the round robin order until the CoS queue's CurrentUseCount is greater than its WeightedUseLimit and it drops out of the round. Each sub round starts from CoS7 and finishes at CoS0. When the ES block is selecting CoS0, next time it will start from CoS7 again.

Although the WDRR accounting is in cells, the bandwidth sharing is actually byte-accurate. This is accomplished by also keeping track of the actual number of bytes sent using a ResidueCount 315, in FIG. 3, that is tracked per COS queue. The MMU does not actually know what is sent on the wire since the EP may modify the size of the outgoing cell. This byte level reporting of the size of the modified cell transmitted by the EP is provided asynchronously to the MMU by the EP (see EP_Tx_Cell_Length in FIG. 3). The MMU makes use of the ResidueCount to make adjustments to its accounting based on the feedback provided by the EP.

The way the ResidueCount operates is as follows. For every cell's worth of packet being scheduled, i.e., for every 128 bytes for example, the CurrentUseCount may be incremented by 1. If the EP modified length is not equal to a single cell size, then the ResidueCount may be adjusted. The difference between the cell size and the actual EP modified cell length may then be added to the ResidueCount. Depending on the state of the ResidueCount, the CurrentUseCount and the ResidueCount may both be further adjusted. When the ResidueCount is negative, it implies that more was sent than currently accounted for. When the ResidueCount is positive, this implies that less was sent than currently accounted for, as documented in the p-code.

During each round, if either the QM or SC queue becomes non-empty, ES block will suspend round robin scheduling while taking note of where it has left off. Then, the ES block will then service these two queues first and when both of these queues are empty, ES block will resume the round robin scheduling and start from where it had left off. As discussed above, the QM queue has higher priority over the SC queue.

Figure 4:
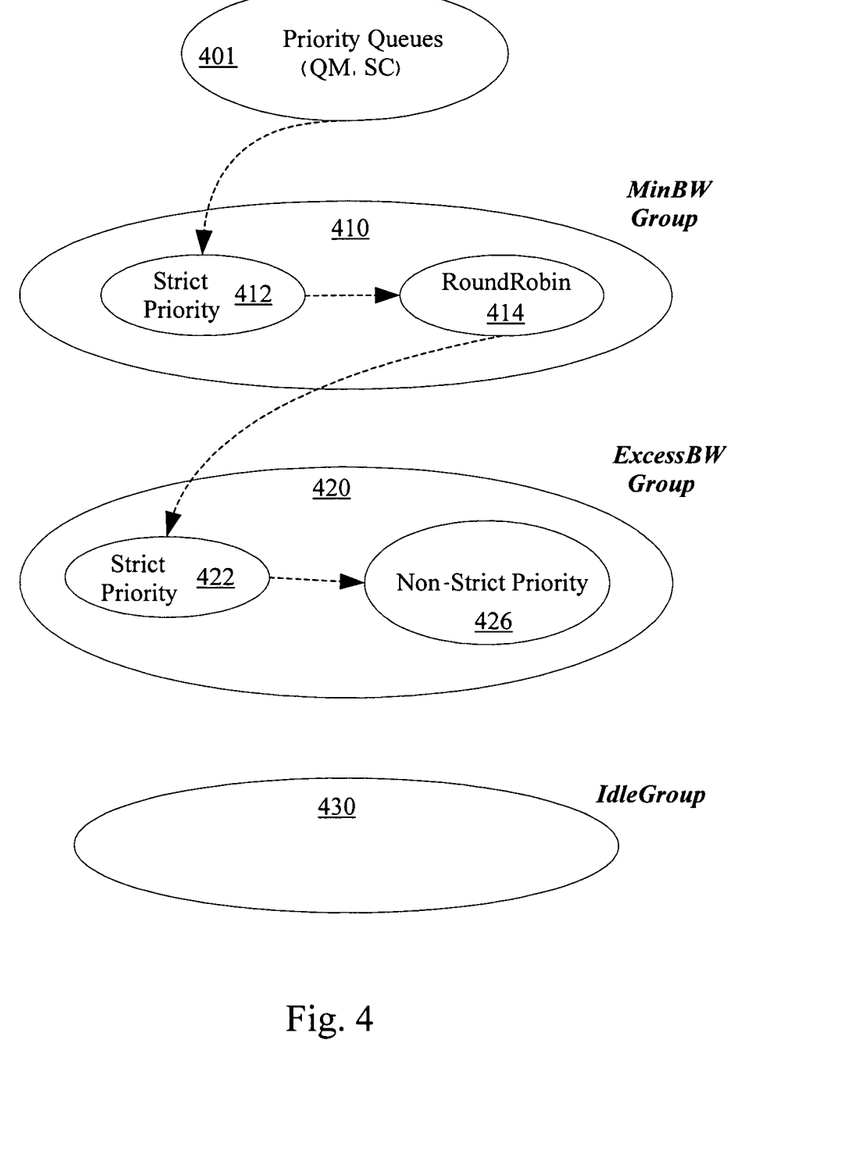
FIG. 4 illustrates the scheduling groups used in an exemplary embodiment of the present invention.

The WDRR scheduler interacts with the minimum bandwidth metering and maximum bandwidth shaping that is available per CoS queue. Min/Max BW mechanisms associated with each CoS queue results in the identification of scheduling groups. These groups are illustrated in FIG. 4. The groups include the following:
1. Priority Queues 401: Composed of the QM and SC queues;

2. MinBW Group 410: Composed of CoS queues which have not yet had their minimum bandwidth requirement satisfied;
3. ExcessBW Group 420: Composed of CoS queues which have had their minimum bandwidth requirement satisfied but have not had their maximum bandwidth requirement exceeded; and
4. Idle Group 430: Compose of COS queues which are either empty or have had their maximum bandwidth requirement exceeded.

Within the MinBW Group 410, there exist two subgroups, the Strict Priority group 412 and the Round Robin group 414. Within the ExcessBW Group 420, there exist two subgroups, the Strict Priority group 422 and the Non-Strict Priority Group. 426 The servicing order of these groups is also shown in FIG. 4. The groups and subgroups are serviced in Strict Priority order. For example, this means that if the MinBW is non-empty, nothing in the ExcessBW group are serviced until the MinBW group is empty. The QM and SC queues were mentioned above and they are given strict priority service over the other CoS queues.

Next, the set of queues that have not yet had their minimum BW requirement satisfied are serviced (MinBW group, 410). First, the Strict Priority subgroup 412 is serviced in SP order according to their CoS queue number (higher the CoS queue number, the higher the priority). Secondly, the RoundRobin subgroup 414 is serviced when the Strict Priority subgroup is empty. These CoS queues are serviced in packet round robin order. There exists a per-CoS queue register that is used to indicate how to treat this queue in terms of the two subgroups (Q_SP_Min_Group) within the MinBW group 410. If this register is '1', then the CoS queue is serviced in the StrictPriority subgroup in this MinBW group. Otherwise, the CoS queue is serviced in the Round Robin subgroup. Next, the ExcessBW group 420 is serviced. First, the Strict Priority subgroup 422 is serviced. Next the non-Strict Priority subgroup 426 is serviced according to the scheduler mode. In this section, this mode is assumed to be WDRR. Membership between these two subgroups of the ExcessBW group 420 is determined by the value of the WDRR weight. If a queue's weight register is programmed as 0, this queue will be treated as a member of the Strict Priority subgroup and will not participate in WDRR selection.

Figure 5:
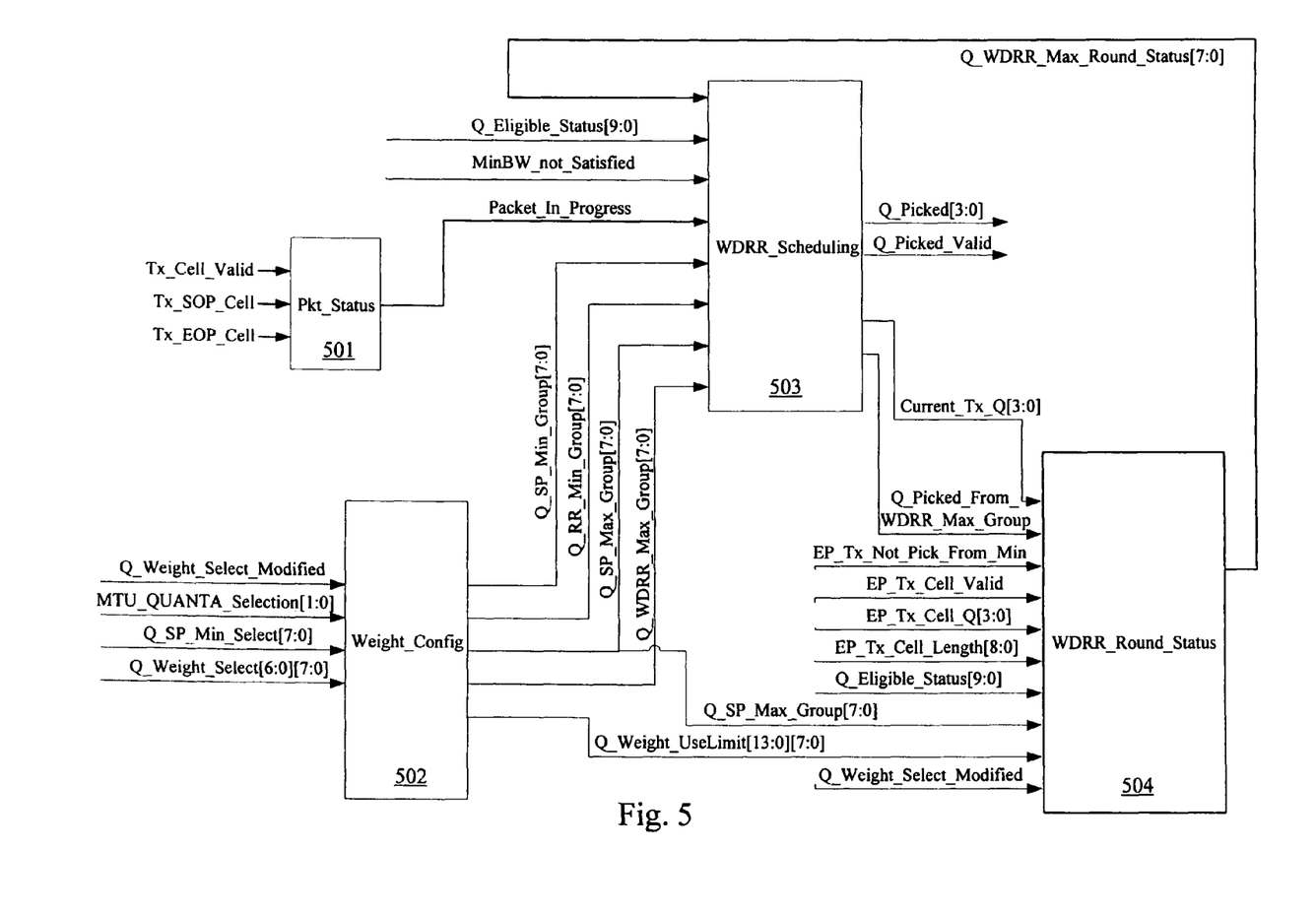
FIG. 5 illustrates the relationships between scheduling processes in an exemplary embodiment of the present invention.

The overall functionality of the present scheduling process are further illustrated in FIG. 5. The packet status is output from the packet status module 501, based on cell values received. The output is sent to the WDRR scheduling module, which receives various inputs in order to select a particular queue. The weight configuration module 502 receive weight information and outputs minimum and maximum values that are used by the WDRR scheduling module 503 and the WDRR Round Robin status module 504, in order to facilitate scheduling.

A user may configure the MTU_QUANTA_SELECT to be smaller than the actual MTU associated with this port. The requirement for this misconfiguration case is that the scheduler will continue to service packets. In this implementation, such a misconfiguration may result in momentary "bubbles" in operation and consequently the scheduler becomes non-work conserving. However, the scheduler is able to operate at a rate faster than line rate. Consequently, the non-work conserving behavior is not visible to an outside observer. At present, the worst case scenario identified is if a single CoS queue has associated with it a weight of 1 and an MTU_QUANTA_SELECT of 2 kbytes. If the actual MTU of the system is 16 kbytes, then in the worst case, the scheduler must refresh the CoS queue's CurrrentUseCount over 8 rounds before it is able to be scheduled again. However, given the MMU is able to schedule faster than line rate and given the egress port is able to buffer up to 14 cells, this misconfiguration issue should not be visible to an outside observer.

The user may configure the WDRR configuration registers while servicing live traffic. The requirement is that operation must continue without interruption in service. In this implementation, whenever a WDRR configuration register is written to (regardless of whether the value is actually changed), the CurrentUseCount is reset to 0 and all COS queues become eligible for the subsequent WDRR round. The registers that trigger this behavior include the Q_Weight_Select and the MTU_QUANTA_SELECT.

A Min/Max Shaping Mask is based its queue's minimum Bandwidth requirement and maximum allowable bandwidth. When any one of queue's minimum bandwidth requirement is not satisfied, this queue has a higher priority than other queues which satisfied their minimum bandwidth requirement. If more than one queue is not satisfied its minimum requirement, these queues will based on either Strict Priority or Round Robin method to pick one queue. When any one is satisfied, this queue will be dropped out from this minimum list.

When all of queues have satisfied their minimum bandwidth requirements, all the queues will be entered into a state to gain maximum allowable bandwidth. Still, between each eligible queue, the ES block will, based on either Strict Priority, Round Robin, Weighted Round Robin or Weighted Deficit Round Robin Scheduling method, pick one queue for distributing the excess bandwidth. After each queue satisfies its maximum bandwidth requirement, it will be dropped from max list. During the time of transmission, some queues may switch between min group and max group because of their minimum bandwidth condition has been met. When there is a switch between min/max group, the ES will only trigger a credit reset on min group rather than reset on all queue, to prevent max queue's bandwidth distribution being disturbed.

Before the ES block selects a queue, each queue's empty status will pass through a min/max shaping mask to find out if the current port is in a minimum shaping state or in a maximum shaping state. This min/max shaping mask is only applied to Packet boundary; if this mask is set during a packet transmission, it will not take effect until the completion of the current packet transmission. It should be noted that QM and SC queues do not participate in min/max shaping. They are always governed by strict priority to get scheduled out. In general, when queues do not participate in min/max shaping, they are always scheduled out using strict priority.

The buckets discussed below are not in Egress Scheduler block. However, their function descriptions are listed in the following sections to give a broader view, since their behaviors are deeply correlated with Egress scheduler functionality.

Each queue of each port has its own Min Bucket (or Minimum Shaping Bucket) to count for satisfaction of a minimum bandwidth requirement. When a packet is sent from a queue, the length of this packet will be added into the Min Bucket. The Min Bucket stops counting new transmitted packet length when the bucket is over its High Threshold. This means that the bucket is saturated at the High Threshold. When a refresh cycle time has expired, refresh tokens are leaked away from each Min Bucket. Each refresh cycle is 7.8125 us, according to one embodiment and, for every one token leaked away, it means this queue's Min Bucket is refreshed at rate of 64,000 bit per second, in that embodiment.

When tokens inside Min Bucket are over Low Threshold, the queue's Out_Profile_Flag will be set. And when Bucket is under its Low Threshold, its Out_Profile_Flag will be reset.

This flag is used by Egress Scheduler to determine in which region the current queue is at, and apply proper scheduler arbitrations on a port. In Min not Satisfied region, Egress Scheduler is applying RR+SP arbitration scheme In Min Satisfied and Max not Satisfied region, Egress Scheduler is applying any kind of arbitration scheme. (WDRR, WRR, RR+SP).

The Min Bucket accounts for all the tokens transmitted within the minimum and maximum region to make sure each queue is not under its minimum bandwidth requirement. When a queue constantly transmits greater than its minimum bandwidth, this Min Bucket will get saturated at High Threshold and will not drop down below Low Threshold. That means this queue is only operate at Max Region after it satisfies its minimum bandwidth requirement. In order to resolve this accounting issue, a new restriction is added to Min Bucket.

The Min Bucket can only add tokens when a packet is transmitted within the MinBW Region. If a packet is transmitted half way when Min Bucket is over its Low Threshold, the Min Bucket will continue add tokens until this packet transmission is completed. When Min Bucket is over its Low Threshold, its Out_Profile flag will be set. The Egress Scheduler will not treat this queue as having a minimum Bandwidth requirement being satisfied. After a couple of refreshes, the Min Bucket will drop below its Low Threshold, and Out_Profile flag will reset to in profile status. The Egress Scheduler will treat this queue as the minimum Bandwidth requirement not being satisfied again.

Each queue of each port also has its own Max Bucket (or Maximum Shaping Bucket) to count for satisfaction of the maximum bandwidth requirement. When a packet is sent from a queue when the queue is still under the maximum bandwidth requirement, the length of this packet will be added into the Max Bucket for the queue. When a refresh cycle time is expired, refresh tokens are leaked away from the Max Bucket of each queue. Each refresh cycle is a fixed amount of time, which may be, for example, 7.8125 micro seconds, according to a particular embodiment. Therefore, for every one token leaked away, it means this queue's Max Bucket is refreshed at a fixed number of bits/sec, which may be 64,000 bits per second for an embodiment of the invention.

When tokens inside Max Bucket are over the Threshold, the queue's Out_Profile_Flag will be set. And when the Max Bucket is under its Low Threshold, its Out_Profile_Flag will be reset. This flag is used by the Egress Scheduler to determine if a given queue is using all of its allowable bandwidth. When set to Out-Profile status, this queue will not be able to participate in scheduler arbitration until its flag is reset to In-Profile Status.

The Egress Port Metering Mask is based on its port's predefined Bandwidth requirement on maximum allowable bandwidth. When a port's maximum bandwidth requirement is not satisfied, this port is allowed to do transmission. If a port's transmission takes away too much bandwidth, i.e. more than its allowable, this egress metering mask will get set. When this mask is set, no more packets can be allowed to be sent out from MMU. The MMU waits until this egress port metering mask gets reset and resumes transmission. The assertion of the Egress Port Metering flag will retain each queue's credit count and hold them until flag is de-asserted and resumes scheduling. This mask is only applied to the packet boundary; i.e. if this mask is set during a packet transmission, it will not take effect until the completion of the current packet transmission.

Each port has one Port Metering Bucket (or Port Shaping Bucket) to provide satisfaction of the maximum bandwidth requirement for a port. When a packet is sent from any queue of a port, when this port has not satisfied its port maximum bandwidth, the length of this packet will be added into Port Metering Bucket. When a refresh cycle time has expired, refresh tokens are leaked away from each Port Metering Bucket. Each refresh cycle is 7.8125 us, according to one embodiment. For every one token leaked away, it means this port Metering Bucket is refreshed at rate of 64,000 bit per second, in that embodiment.

When tokens of Port Metering Bucket are over the Port Metering Threshold, the port's Out_Profile_Flag will be set. And when tokens inside the Port Metering Bucket are under the Port Metering Threshold, the port's Out_Profile_Flag will be reset. This flag is used by the Egress Scheduler to determine whether a given port is able to transmit or not. However, this flag is used only at the start of a new packet transmission. During the actual packet transmission, the Egress scheduler will not stop transmission, even this Flag is switched from In-Profile to Out-Profile status. Thereafter, the port will not be able to resume transmission until its flag is reset to In-Profile status.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed:

1. A network device for processing data, the network device comprising:
    at least one egress module for transmitting incoming data to at least one egress port;
    wherein the at least one egress module comprises an egress scheduling module and multiple queues per each of the at least one egress port, wherein each of the multiple queues serve data that is attributable to a class of service;
    a weight register used to store a weight value for each of the queues;
    wherein the egress scheduling module uses a weighted deficit round robin (WDRR) schedule to provide a bandwidth sharing scheme where up to a weighted amount of traffic is serviced from each of the queues in each of one or more rounds;
    wherein a current use count is tracked for each queue to indicate an amount of traffic serviced from the queue during each round;
    wherein a weighted use limit is determined for each queue as:

$$\text{weighted use limit} = (\text{weight value for the queue}) \times (\text{expected maximum frame length});$$

and
    wherein the egress scheduling module is configured to service each of the queues during each round if the current use count for the queue is less than the weighted use limit for the queue.

2. The network device of claim 1 wherein the weight value for a queue that is set to a predetermined value indicates that the queue should be serviced in a strict priority order.

3. The network device of claim 2 wherein at least a first queue of the queues has a weight value set to the predetermined value indicating that the first queue should be serviced in the strict priority order, wherein during a round, if the first queue is non-empty, then WDRR servicing to one or more other of the queues is suspended until the first queue becomes empty.

4. The network device of claim 3 wherein after WDRR servicing to one or more other of the queues has been suspended during the round when the first queue becomes non-empty, the WDRR servicing to the one or more queues is resumed when the first queue becomes empty during the round.

5. The network device of claim 1 wherein a weight value for a queue that is set to zero indicates that the queue should be serviced in strict priority order.

6. The network device of claim 1 and further comprising, for the at least one egress port, a queue management (QM) queue to provide flow control information and a system control (SC) queue to provide system control information, wherein weight values for both the QM and SC queues are set to a predetermined value indicating that the QM and SC queues should be serviced in a strict priority order.

7. The network device of claim 1 wherein each of the queues is marked as eligible for WDRR service for a next round if the current use count for the queue is less than the weighted use limit for the queue.

8. The network device of claim 1 wherein one or more of the queues is assigned to a strict priority group and does not participate in WDRR servicing if the one or more queues each has a weight value set to a predetermined value indicating that the queue should be serviced in a strict priority order.

9. A network device for processing data, the network device comprising:
at least one egress module for transmitting incoming data to at least one egress port;
wherein the at least one egress module comprises an egress scheduling module and multiple queues per each of the at least one egress port, wherein each of the multiple queues serve data that is attributable to a class of service;
a weight register used to store a weight value for each of the queues, wherein a weight value that is set to a predetermined value indicates that a corresponding queue should be serviced in a strict priority order for one or more strict priority (SP) queues;
wherein the other queues, each having a weight that is not set to the predetermined value, being in a group of WDRR queues, being serviced using a weighted deficit round robin (WDRR) schedule to provide a bandwidth sharing scheme where up to a weighted amount of traffic is serviced from each of the WDRR queues in each of one or more rounds;
wherein a current use count is tracked for each WDRR queue to indicate an amount of traffic serviced from the queue during a round;
wherein a weighted use limit is determined for each WDRR queue as:

weighted use limit=(weight value for the queue)×(expected maximum frame length);

and
wherein the egress scheduling module is configured to service each of the WDRR queue during each round if the current use count for the WDRR queue is less than the weighted use limit for the queue.

10. The network device of claim 9 wherein the egress scheduling module is configured to suspend WDRR servicing to the WDRR queues during the round when one of the SP queues becomes non-empty, and then to resume WDRR servicing to the WDRR queues during the round when the non-empty SP queue becomes empty during the round.

11. The network device of claim 9 wherein a weight value for a queue that is set to zero indicates that the queue should be serviced in a strict priority order.

12. A method for processing data, the network device comprising:
transmitting, by an egress module, incoming data to at least one egress port;
using, by an egress scheduling module, a weighted deficit round robin (WDRR) schedule to provide a bandwidth sharing scheme where up to a weighted amount of traffic is serviced from each of a plurality of queues in each of one or more rounds;
tracking a current use count for each of the queues to indicate an amount of traffic serviced from the queue during each round;
determining a weighted use limit for each queue as:

weighted use limit=(weight value for the queue)×(expected maximum frame length);

and
servicing, by the egress scheduling module, one or more of the queues during each round if the current use count for the queue is less than the weighted use limit for the queue.

13. The method of claim 12 wherein a weight value for a queue that is set to a predetermined value indicates that the queue should be serviced in strict priority order.

14. The method of claim 13 wherein at least a first queue of the queues has a weight value set to the predetermined value indicating that the first queue should be serviced in strict priority order, wherein during a round, if the first queue is non-empty, then servicing, by the egress scheduling module, to one or more other of the queues is suspended until the first queue becomes empty.

15. The method of claim 14 wherein, after WDRR servicing to one or more other of the queues has been suspended during the round when the first queue becomes non-empty, resuming the WDRR servicing to the one or more queues when the first queue becomes empty during the round.

16. The method of claim 12 wherein a weight value for a queue that is set to zero indicates that the queue should be serviced in a strict priority order.

17. The method of claim 12 and further comprising marking, by the egress scheduling module, one or more of the queues as eligible for WDRR service for a next round if the current use count for the queue is less than the weighted use limit for the queue.

18. The method of claim 12 and further comprising:
assigning at least one of the queues to a strict priority group if the at least one of the queues has a weight value set to a predetermined value indicating that the queue should be serviced in a strict priority order.

* * * * *